United States Patent
Shuy et al.

(10) Patent No.: US 8,692,470 B2
(45) Date of Patent: Apr. 8, 2014

(54) DESIGNS FOR CONTROL ON SOLAR POWER SYSTEM WITH EXTREME LOW ENERGY CONSUMPTION

(75) Inventors: Geoffrey Wen-Tai Shuy, Taipei (TW); Wen Ten Chang, Koahsiung (TW); Hsin-Chen Lai, Taichung (TW)

(73) Assignee: LT Lighting (Taiwan) Corp., Hsinchu (TW)

( * ) Notice: Subject to any disclaimer, the term of this patent is extended or adjusted under 35 U.S.C. 154(b) by 0 days.

(21) Appl. No.: 13/584,198

(22) Filed: Aug. 13, 2012

(65) Prior Publication Data

US 2013/0271016 A1    Oct. 17, 2013

(51) Int. Cl.
*H05B 37/02* (2006.01)
(52) U.S. Cl.
USPC .......................................................... 315/159
(58) Field of Classification Search
USPC ................................................. 315/149–159
See application file for complete search history.

(56) References Cited

U.S. PATENT DOCUMENTS

| | | | |
|---|---|---|---|
| 4,977,351 A * | 12/1990 | Bavaro et al. | 315/87 |
| 6,685,334 B2 | 2/2004 | Kenny et al. | |
| 7,641,357 B2 | 1/2010 | Tanamura et al. | |
| 2009/0261736 A1 | 10/2009 | Chang et al. | |
| 2010/0292815 A1 * | 11/2010 | Pan | 700/90 |
| 2012/0200235 A1 | 8/2012 | Shuy et al. | |

FOREIGN PATENT DOCUMENTS

KR     20110029767     3/2011

* cited by examiner

*Primary Examiner* — Thienvu Tran
(74) *Attorney, Agent, or Firm* — Workman Nydegger (57) ABSTRACT

This patent discloses designs of a controller for a solar powered LED lamp system. The control unit includes a controller that has a switching network and that selectively charges a battery from a solar panel, and selectively discharges the battery to power a lamp. The lamp itself includes a second part of the control unit that prevents over-charge and under-charge conditions of the battery. This may be accomplished using a low power passive network of LEDs and resistors, leaving the controller itself to only perform switching. Thus, the power consumed by the controller, and by the LED lamp system as a whole, may be significantly reduced.

15 Claims, 4 Drawing Sheets

DESIGNS FOR CONTROL ON SOLAR POWER SYSTEM WITH EXTREME LOW ENERGY CONSUMPTION

BACKGROUND

Solar powered street lighting systems are in commercial use. Solar powered street lighting systems receive solar energy from the sun in the form of light. The light photons are converted into electricity by a solar panel. A battery system stores electrical energy, from which the electricity may later be drawn to power the street lamp as needed. A control unit regulates both the incoming electrical energy to the battery and the outgoing energy from the battery to protect the battery from overcharging or over-draining along with other fundamental functions regulating energy storage and lighting on/off control. To do this, the control unit uses circuitry that converts DC current to AC current for power transportation, and then converts the AC current back to DC current for energy storage or for powering the LED lamps. The control unit further includes a Pulse Width Modulator (PWM) for voltage regulation.

Conventional commercial solar powered street lighting systems aim to be able to provide lighting over three continuous rainy. However, existing commercial solar powered street lamps are unable to accomplish this under certain normal and common situations. Thus, streets arrayed with such solar powered street lamps are often left dark.

BRIEF SUMMARY

The inventors performed a study to thoroughly reveal all of the root-cause key issues which can (separately or collectively) result in having the aforementioned problems. They further formulated designs accordingly to resolve each of the independent root-cause key issues to collectively overcome the problem. One issue is related to the nonstop energy consumption (24 hours per day) of the control unit for DC-AC-DC conversions, charge/discharge voltage regulations, and battery protections. In accordance with the inventive principles described herein, direct current is used directly without converters or regulators, to passively protect the batteries. Furthermore, the control unit performs only switching functions. Thus, the system consumes extremely small amount of energy; as disclosed in this patent disclosure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Conventional commercial solar lamp systems aim to be able to provide lighting over three continuous rainy. However, existing commercial solar powered street lamps are unable to deliver this goal under certain normal and common situations (referred to herein as the "stated problem").

The inventors performed a study to thoroughly reveal all of the root-cause key issues which can (separately or collectively) result in having the stated problem. The discovered root-cause key issues are related to: (1) an incorrect solar panel orientation that much reduces the actual solar energy collected (as compared to what it could be if oriented correctly to the received solar energy); (2) the lamps do not operate in the full range of the battery's terminal voltage; thus only a portion of the energy stored in the battery can be utilized for lighting; (3) the associated control unit performing DC-AC-DC conversions, regulating the charge/discharge voltages, and protecting the battery 24 hours a day, thus consuming a significant (large) amount of daily energy resulting in very small net energy gain on sunny-days, or a very large energy deficit on dark-days; and (4) the practice of integrating mismatching-subsystems into the system.

The inventors have developed designs to resolve each of the root-cause key-issues to collectively overcome the problem. One issue is related with nonstop (24 hours per day) excessive energy consumption by the control unit (listed as the third of four root causes). The inventors found a way to use the electric energy in direct current (DC) form directly without converters or regulators, to passively protect the batteries, and to design the control unit such that it performs only switching functions. Thus, the control unit consumes extremely small amounts of energy. The controller designs that alleviate this root cause will be further described herein.

Solar lamp systems include four subsystems including 1) the solar panel that receives sun-originated photons, and converts a portion of the corresponding photo energy to electricity, 2) a battery that receives and stores the electricity generated by the solar panel, 3) a lamp that consumes the electricity from the battery when the lamp is to emit light, and 4) a control unit. The conventional control unit controls several things including: (a) when the lamp is to be on and off; (b) when to start and to stop battery charging; and (c) the performance of DC-AC-DC conversions; (d) the regulation of the voltages for battery charge/discharge and (e) the protection of the battery from over-charged or over-drained conditions. When combining the lamp built with the passive network (described in co-pending, commonly assigned patent application Ser. No. 13/312,902, filed Dec. 6, 2011, the entire contents of which are incorporated herein by reference), the control unit performs more than just the functions stated above, but also controls how much electrical power is supplied to the lamp when the lamp is on.

Therefore, the control unit described herein can be separated into two parts. One of the two parts (called hereinafter "the first part") is called the "control box" or "controller". This part relates to the circuit-designs that control the actions of switches; and performs the first two functions stated above, namely: (a) when the lamp is on and off; and (b) when to start and to stop battery charging. The designs and the devices for the first part will be described herein in further detail below.

The second part of the control unit (hereinafter referred to as "the second part") is built into (and as part of) the LED lamps, as described in the related patent application, previously incorporated by reference. This second part of the control unit, (through the use of LED and resistor networking) not only can operate the lamp in full battery voltage range in DC form without any DC-AC-DC conversions or charge/discharge voltage regulations; but the second part also can control how much electrical power is supplied to the lamp when the lamp is on; and can also prevent the battery from over-charged or over-drained conditions when designed properly. This second part of the control unit is related to an idea of using the invented LED and resistor networking to modify the I-V characteristics of LED lamps. It is very different from the first part of the control unit that utilizes circuit-designs to control the actions of switches. Thus, the second part of the control unit is described in further detail in the related patent application previously incorporated by reference, while this patent application focuses on the first part of the controller.

The control unit includes; (1) the invented control box or "controller" as described herein (referred to as the "first part"), and 2) the novel LED lamp designs using the invented LED and resistor networking to modify the I-V characteristics of LED lamps (as described in the related patent application previously incorporated by reference, as referred to herein as the "second part"). Prototypes were built to verify that these lamps can really be operated in the full battery energy storage range with DC form directly (without DC-AC-DC conversions). The systems can also improve their efficacy when battery energy storage is draining down to provide above required brightness. In other words, the novel system can continuously (and/or step by step) improve efficacy when battery energy storage is draining down; and also utilize its full energy storage capacity efficiently. Furthermore, these prototypes were also verified to be capable of preventing the battery from being over-charging or over-draining. These prototypes (built with the second part of the control unit) verified that the control unit can provide extra lighting stamina on long continuous dark days; even when using the same solar panel and battery of a conventional commercial system.

Since the above designed LED lamps can also provide the functions of preventing the battery from over-charging or over-draining, the first part of the control unit, the control box, can be relieved of its conventional "battery protection" duty as well as DC-AC-DC conversions and voltage regulations (which consumes significant amount of energy). Accordingly, the control box described herein only consumes small amounts of energy since the control box may be devoted to switching, and not to battery protection, DC-AC-DC conversions, or voltage regulations.

The following described in further detail the control box portion of this control unit; namely, a control box that performs only the switching functions of 1) charging or not charging the battery from the solar panel, or 2) discharging or not discharging the battery electricity to the LED lamps for lighting.

Having described the general principles of the embodiments described herein, example embodiment themselves will now be described with respect to FIGS. 1 through 4.

Figure 1:
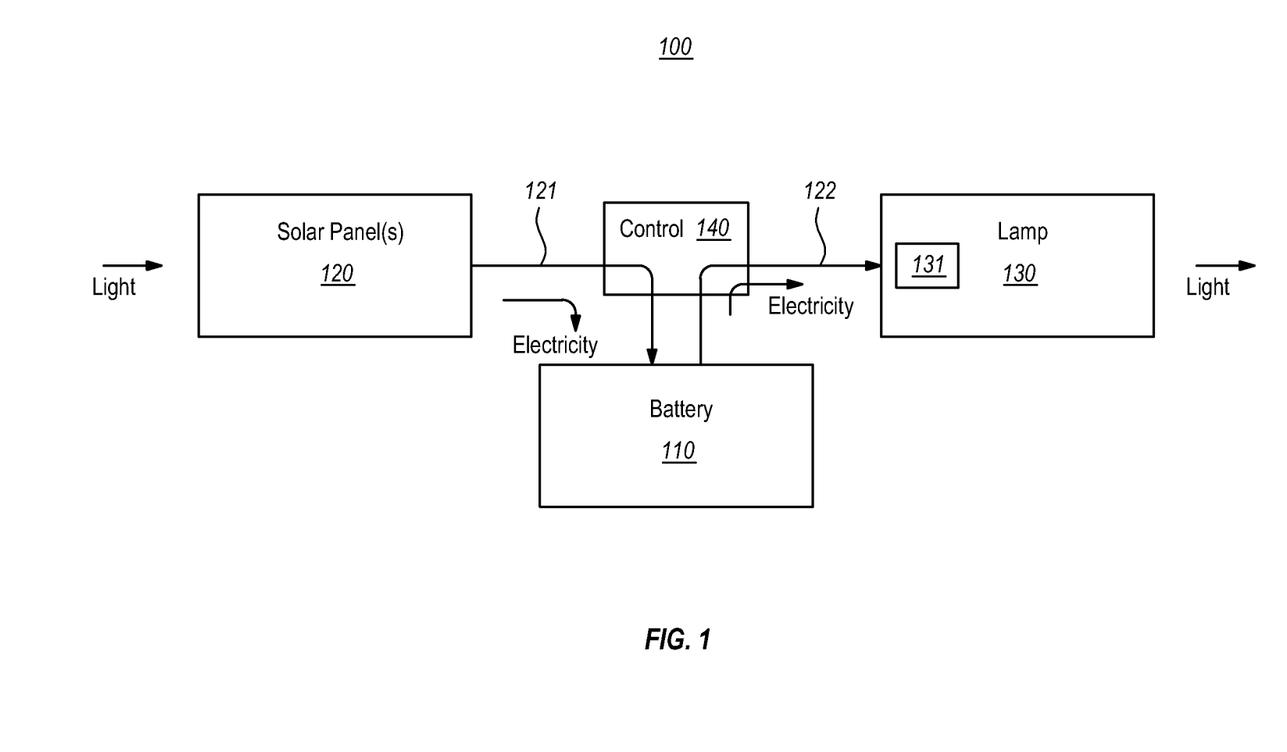
FIG. 1 abstractly illustrates a solar panel lamp system in accordance with principle described herein.

FIG. 1 illustrates a solar powered lamp system 100 that includes four subsystems such as a battery 110, a solar panel 120, a lamp 130, and a controller 140. Sun-originated light is incident on the solar panel 120. The solar panel 120 may be a single solar panel or a network of solar panels. Furthermore, the solar panel may be a currently existing solar panel, or may be a solar panel that is developed in the future. Nevertheless, as mentioned above, improved performance may be obtained even using existing solar panels. The solar panel 120 converts at least a portion of the incident light into electricity with a particular efficiency that may vary depending on the type of solar panel.

An energy collection routing circuit 121 is configured to route electrical power from the solar panel 110 to a battery 120 when the solar panel 120 and the battery 110 are coupled as illustrated. In this way, the energy collection routing circuit 121 channels electricity from the solar panel 120 to the battery 110 to charge the battery and thereby increase its energy storage during sunny conditions. While the battery 120 may be any type of battery, the principles described herein allow for improved performance even using the same battery as conventional solar lamp systems. In fact, the principles described herein may be broadened to a case in which element 110 is any electrical energy source such as, for example, a power supply device supporting by an electrical power grid. In that case, there would be no need for the lamp system 100 to include solar panel 120 or energy collection routing circuit 121. Thus, the lamp system may not have any physical "battery". In fact, the battery 110 can be replaced by "an electrical energy source". The battery 110 will be described hereinafter and is only an example of such an electrical energy source.

An energy consumption routing circuit 122 is configured to selectively route electrical power from the battery 110 (or more broadly, the "electrical energy source") to a lamp 130 when the battery 110 and lamp 130 are coupled as illustrated. In this way, the energy consumption routing circuit 122 channels electricity from the battery 110 (or more broadly, the "electrical energy source") to the lamp 130 when the lamp is consuming electricity during dark conditions. In some embodiments, the lamp 130 may emit light from one or more light emitting diodes (LED) and/or may be a street lamp that is elevated above a street, road, walkway, or area.

A controller 140 is configured to selectively channel electricity from the solar panel 120 to the battery 110 via the energy collection routing circuit 121 during light conditions, and selectively configured to channel electricity from the battery 110 to the lamp 130 during dark conditions. The controller 140 may be quite simple as it performs a simple on-off switching function. Accordingly, the daily energy consumed by the controller may be quite low as mentioned above. Depending on the electrical energy source, in some cases (such as the case of an electrical power grid) such selective channeling will not be necessary.

The solar lamp system 100 is configured such that when the energy consumption routing circuit 122 routes electrical power from the battery 110 (or more broadly, the "electrical energy source") to the lamp 130, the system 100 adjusts the amount of power delivered along the energy consumption routing circuit 122 downward as a function of a remaining amount of available electrical energy in the battery. As mentioned above, since terminal voltage V is a function of the remaining electrical energy in the battery, this might be accomplished using the terminal voltage. In the more general case of an electrical energy source, this may be done based on any parameter which relates to available energy in the electrical energy source. Furthermore, as mentioned above, this reduction in power consumption may be greater in proportion than the reduction in light emissions due to improved efficacy at lower power consumption.

In some embodiments, the reduction in power consumption when the terminal voltage (or more generally the available energy or power in the electrical energy source) declines may be accomplished using a passive network. For instance, the passive network 131 may be included within the lamp, and may include LED diodes, and potentially also resistors. However, the principles of the present invention are not limited to such a design. For instance, a passive network may route current through voltage drops such that when the voltage at the input of the passive network is higher (reflective of a higher battery terminal voltage), more LED diodes in the passive network are actively emitting than that when the voltage at the input of the passive network is lower. Thus, as the terminal voltage reduces, so does the number and intensity of the LED diodes that are emitting in the passive network.

The principles described herein are not limited to the particular functional relationship between the power consumed by the lamp 130 and the terminal voltage of the battery 110. Nevertheless, it is most advantageous when the relationship is defined such that a reduction in the power consumption causes a proportionately lesser reduction in the light emissions.

Figure 2:
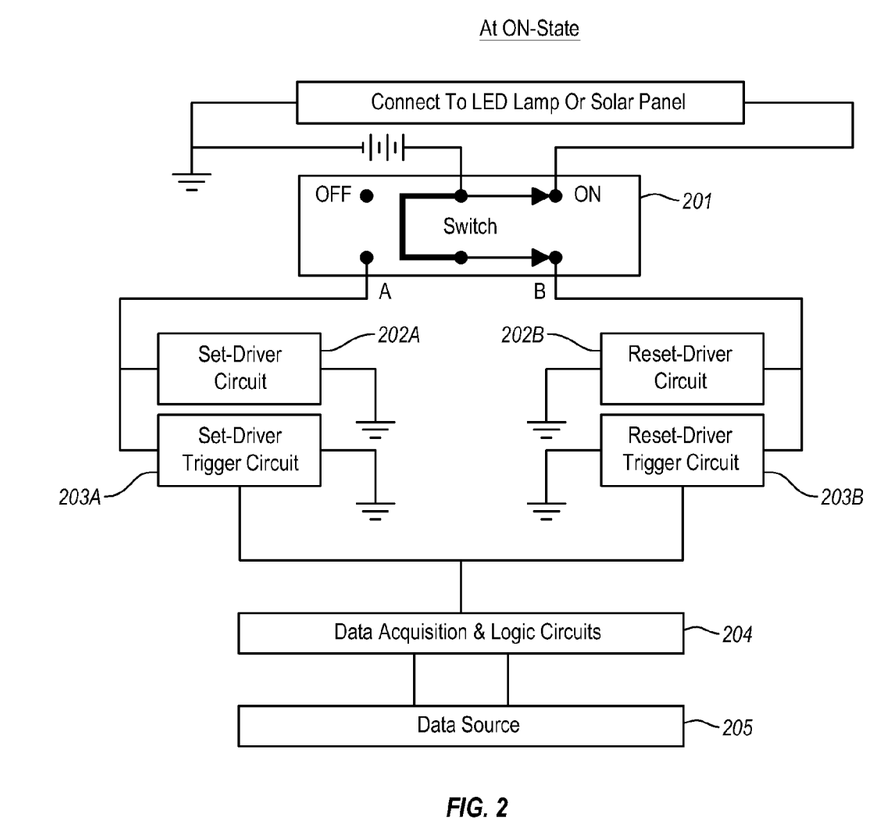
FIG. 2 illustrates the example of a switch flipped from the on-state to the off-state, which connects power to the set-driver/trigger and disconnects power from the reset-driver/trigger.
Figure 3:
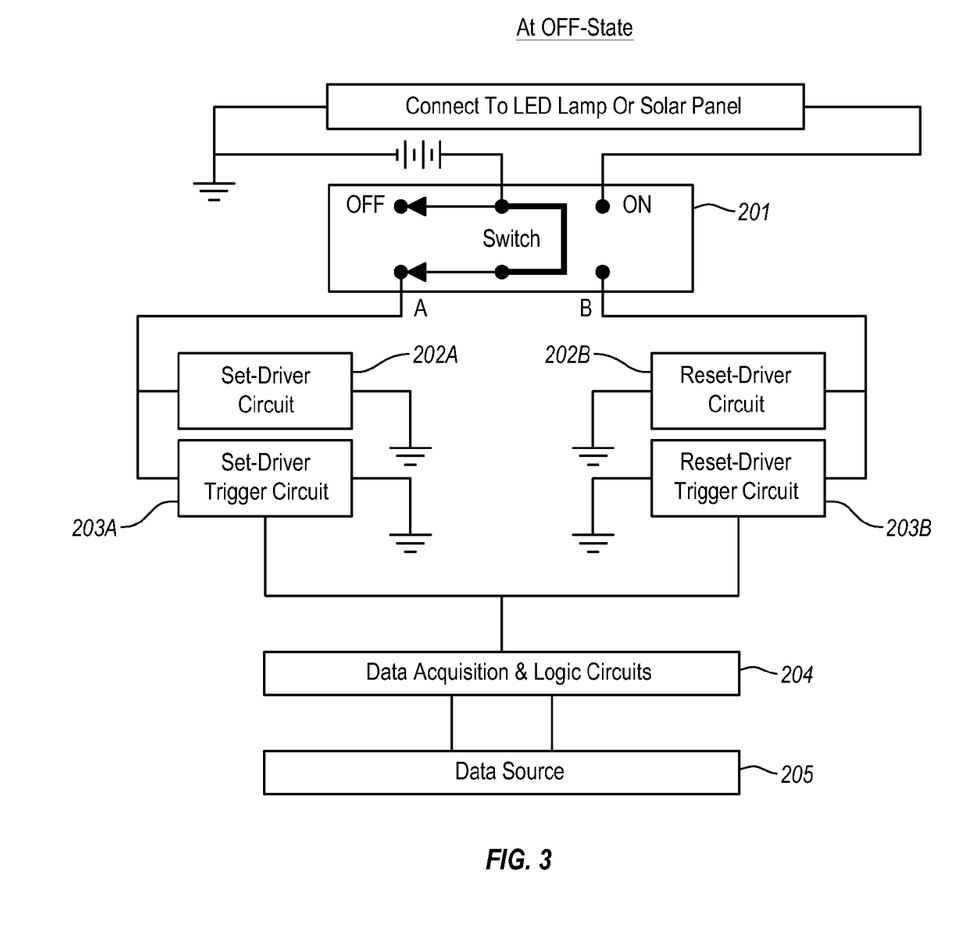
FIG. 3 illustrates the example of a switch flipped from the off-state to the on-state, which connects power to the reset-driver/trigger and disconnects power from the set-driver/trigger.

At least one embodiment described herein relates to a design and a device, such as a control box. In one embodiment, the device consists of two switches, four driving circuits, four corresponding trigger-circuits, and circuits for data acquisition and logic determination. FIG. 2 shows a switch 201 and its corresponding support circuitry. The controller 140 includes two switches, one for connecting and disconnecting the battery 110 (or "electrical energy source") to the solar panel 120, and one for connecting and disconnecting the battery 110 (or "electronic energy source") to the lamp 130. FIG. 2 illustrates a situation in which the switch 201 is turned on, and FIG. 3 illustrates a situation in which the switch 201 is turned off. As illustrated in FIGS. 2 and 3, each switch 201 is associated with two driving circuits 202A and 202B. One driving circuit 202A drives the corresponding switch from the off-state to the on-state; and the other driving circuit 202B drives the corresponding switch from on-state back to off-state. Each driving circuit 202A and 202B is associated with a corresponding trigger circuit 203A and 203B that triggers the driving circuit to upon encountering an appropriate condition. The data acquisition and logic determination circuit subsystem 204 provides the signal to the trigger circuit 203A or 203B when this appropriate condition occurred. Thus, no energy is consumed other than during the actual driving action, thereby achieving the design goal of extremely low energy consumption.

In other words, each of the two switches (two instances of switch 201) is equipped with a set of identical (or non-identical) driving and triggering subsystems. Consider the condition in which one set of the above mentioned subsystems (let us call a "first subsystem") is connected to the power source as in a standby-state, waiting for signal (from the logic determination subsystem) to activate the driving action which turns the switch from one state to the other state (on to off, or off to on). While the first subsystem is in such a standby-state, the other set (let us call a "second set") is disconnected from the power source such that it is in a resting-state; such that no action can be induced even if activation signals are delivered to this resting subsystem.

The switches are further designed to control the connecting/disconnecting of the power to the two sets of driving/triggering subsystems such that: (a) when the set in standby-state is activated to drive the switch, the action will also switch off the power source to this standby-set that sends this set to the resting-state; and (b) simultaneously, this action connects the other set to send it to the standby-state. The following describes the detail design considerations of the switches, the driving circuits, the trigger-circuits, and the circuits for data acquisition and logic determination; respectively.

One of the two switches (i.e., a "battery discharge switch") is designed to perform the following two functions: (a) As illustrated in FIG. 2, to start the battery discharging, the battery discharge switch is flipped from the off-state to the on-state (also referred to herein as "setting" the battery discharge switch), or (b) As illustrated in FIG. 3, to stop the battery discharging, the battery discharge switch is flipped from the on-state to the off-state (also referred to herein as "resetting" the battery discharge switch). The other switch (i.e., a "battery charge switch") is designed to perform the following two functions: (a) As illustrated in FIG. 2, to start the battery charging, the battery charge switch is flipped from the off-state to the on-state (also referred to herein as "setting" the battery charge switch), or (b) as illustrated in FIG. 3, to stop the battery charging, the battery charge switch is flipped from the on-state to the off-state (also referred to herein as "resetting" the battery charge switch).

Figure 4:
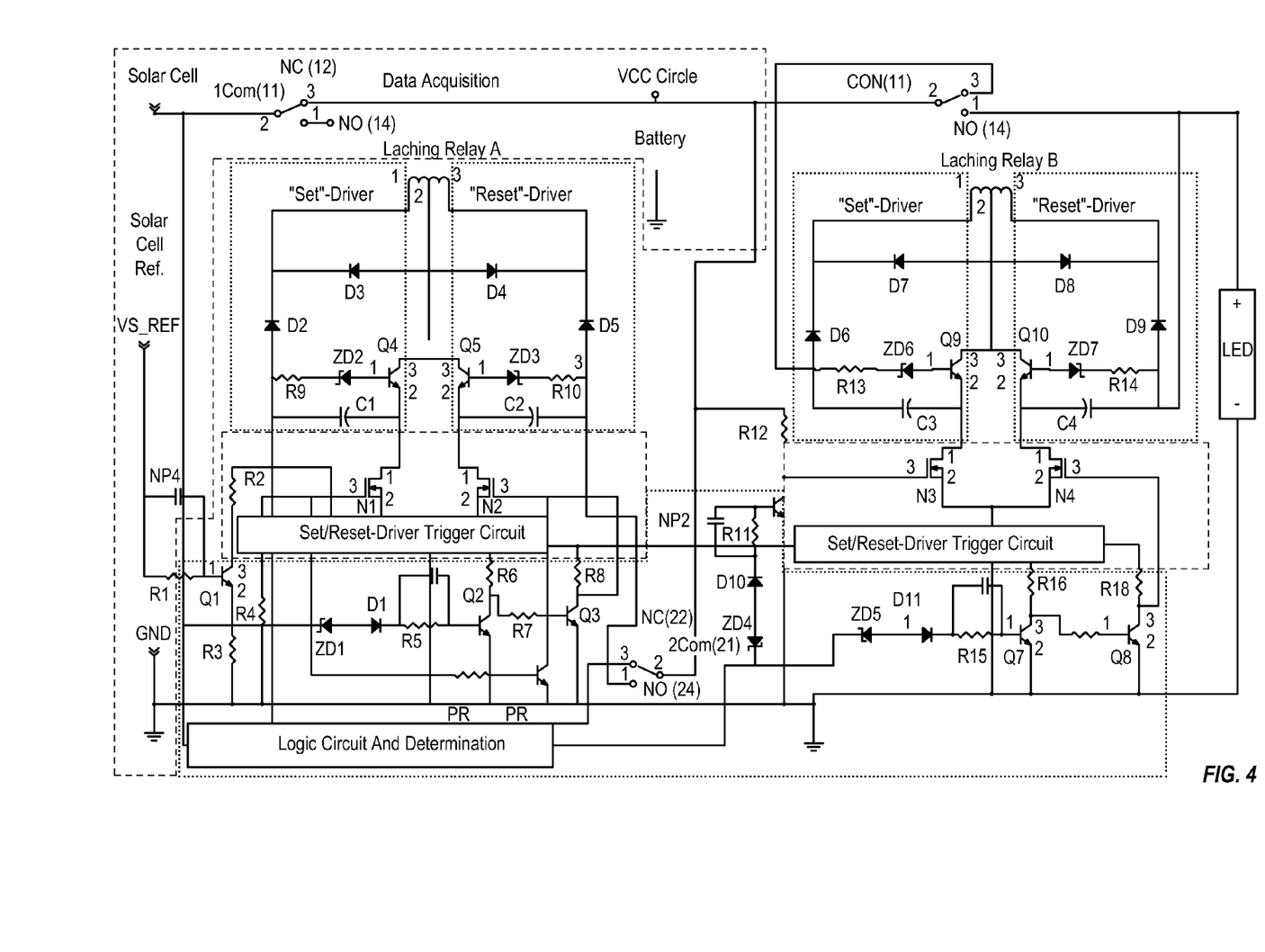
FIG. 4 illustrates an example of the designed control box using two latch-relays as switches which consist of data Acquisition circuit, Logic determination circuit, Set & Reset-driver trigger circuits, and Set-driver & Reset-driver circuits.

In normal operation, there would be perhaps very few switch-flipping actions per day. For energy savings, each of the battery discharge switch and the battery charge switch stays in one state until driven out to the other state. For instance, as illustrated in FIG. 4, each switch could be implemented as a latch-relay. A latch-relay is a relay that do not consume any energy when staying in one state; but rather consumes energy when change states. In the case of each switch being a latch-relay (reference switch 401), each switch being associated with two driving-circuits (drivers) namely: 1(1) the "set-driver" 202A which as illustrated in FIG. 3 supplies power that can turn-on the switch from its off-state, and, and (2) the "reset-driver" 202B to supply power that can turn-off the switch from its on-state as illustrated in FIG. 2. Each switch also designed to control the power delivered to its corresponding two drivers. When in its on-state, the switch connects the power to its reset-driver and disconnects power from the set-driver; which prepares the switch's reset-driver at a standby-state and its set-driver at resting-state. While at its off-state, the switch prepares its set-driver at standby and its reset-driver at resting-state. This design protects the switch from the most damaging false-switch-actions; namely, driving a switch to set and reset simultaneously. The trigger circuits can be designed to connect their power similarly; can be either at the standby state or at resting state, the same state as the driver it prepared to trigger.

To further elaborate the key point stated above, they may be restated as follows: At the standby-state, the driver is connected to the battery power, waiting to be triggered to perform the designed action; either to turn-on or to turn-off the switch. When the action is performed, the driver is switched from the standby-state to the resting-state at the same time. While at the resting-state, this driver loses its driving-ability due to its being disconnected from the power source. In other words, when the driver is at the standby-state, the driver is connected with battery and waiting to be triggered. When the driver is triggered, the driver will consume battery energy to power and to perform the designed action. The driver then reverses the state of the switch (from on-state to off-state; or off-state to on-state). This action also disconnects the battery power from this driver, sending the driver into the resting-state; this action revitalizes the other driver from resting state into standby state at the same time. Therefore, only one of the drivers can perform the switching action (when triggered) to reverse the state of the switch; no damaging false-actions can happen then. Furthermore, the duration of the driving action is typically in a few hundredth of a second. Thus, even a typical 5 watts latch relay driver would only consume less than 0.01 joules energy for every switching action. The system typically performs less than 10 switch-actions per day, and thus the controller would averagely consume less than 0.1 joule per day; or less than 0.01 Ahrs energy (from a 12 volts battery). This is an insignificant amount of energy (for typical solar powered lamp systems).

The data acquisition and logic circuits gather information (data), amplify the data when needed, and come-up with a determination (decision) to act or not based by applying logical considerations on the relevant data. When the decision is to act, the circuits are then urged by this decision to send a proper signal to the correct trigger-circuits; to activate the correct standby-driver to power the switch-motion that produces the switching action. Typically, the subsystem is designed to perform this decision one time in about every 15 to 30 minutes; less than 100 actions per day. It takes a few mW to perform the designed functions with action period to be less than 0.01 seconds. Therefore, the data gathering and decision action functions consume less than 1 joule a day; again, an insignificant amount of energy in solar lamp systems.

Prototypes were built in accordance with the above descriptions; in which the control box was designed using two latch-relays as switches. As illustrated in FIG. 4, one switch is designed to perform: (a) to start (flip from off-state to on-state) discharging the battery, or (b) to stop (flip from on-state to off-state) discharging the battery; the other switch is designed to perform: (a) to start (flip from off-state to on-state) charging the battery, or (b) to stop (flip from on-state to off-state) charging the battery. Since there is no energy consumption in maintaining the states of the two latching relay, the designed prototypes (control boxes) consume electrical energy whenever requiring reverse their states. Every state reversion can be accomplished in a very short time and with pulsed power in a few watts. In normal operation, there may be very few (less than 5) switch-flipping actions per switch and per day. Therefore, the designed control box then consumes insignificant amount of energy from the battery.

The prototypes operated with 12 volt battery and with 10 switch-flipping per day per switch; the measured energy consumption of the designed control box still be less than 0.01 ampere-hours daily. This design then has significant energy saving. Thus, by replacing the conventional control box to this invention can strengthen the stamina even further.

The Results of Implementing the Inventions

The principles describe herein, on the other hand, redesign the controller and lamps. As a result, the systems can improve their efficacy during the draining down of its energy storage. The lamps can also be operated in the full range of the battery energy storage directly without DC-AC-DC conversions to provide above required brightness. Thus, this system can provide extra lighting stamina on long continuous dark days; even when using the same solar panel and battery. In other words, the embodiments describe herein can make the reduction in power consumption much faster than its brightness reduction due to the improved efficacy experienced when reducing power consumption. Thus, one day's recharged energy of the existing solar panel can provide for more than three days' reduced power operation at the low energy storage state, even with the same solar panel and battery.

In order to preserve the ability in providing the required brightness, the lighting subsystem is designed such that it can improve its efficacy when the battery storage energy is draining down. In other words, the less the remaining energy stored in the battery, the less it is consumed by the lamps; and yet the lamp still provide the required lighting brightness by improving system efficacy during battery energy draining. This is because the reduction in the lighting energy consumption is proportionately much faster than the resultant reduction in the brightness.

Furthermore, since the designed lighting subsystem can vary its power consumption, this system has further designed into its lamps to consume all the daily energy charged when battery is near its full energy storage state; thus, preventing the battery over-charging situation. The system has further designed into its lamps to consume less than one quarter of the daily energy charged by the solar panel when battery energy storage is closed to drain condition. The closer to the fully drained condition, the less the lamp consumes, with approaching zero energy consumption at the battery drain state; preventing the over-draining situation.

Thus, the lighting subsystem embodiments, described above, can obtain two benefits: (1) one sunny day solar charge can store enough energy in the battery for more than three days of night-lighting without other energy input; as shown in the embodiments; and (2) over-charge or over-drain of the battery are prevented without the active control box intervention. The embodiments allow for a control box then just performing the on/off switching functions for the charging and discharging of the battery. This switching function consumes an insignificant amount of daily energy with the invented designs described herein.

As shown in the embodiments; when replacing the LED lighting units and the associated control unit by incorporating the inventions, the commercial system can then provide a better lighting brightness in the first three nights; starting with full battery storage capacity. After that, it can still keep lighting above the required brightness for three additional nights without any energy input for these 6 consecutive days. Furthermore, this system may cost less than the original system.

When optimized in system performance, also with the system cost restricted to be below that of commercial solar powered street lamps, the novel designed systems can sustain more than nine consecutive rainy days. It provides better brightness than commercial solar panels for the first three nights. The system then continues to provide at greater than 90 percent of the brightness of the previous day for an extra six consecutive dark days without having the light turn off. Furthermore, this system leaps back to provide lighting for more than three additional nights, with only 4 hours effective sun shine at the 10th day. Thus when these principles are combined, they can overcome the problem concerned collectively as described.

The invention claimed is:

1. A controller for an LED lighting system, the controller being a first part of a control unit and comprising:
   a battery charge switch for selectively coupling a solar panel to a battery for selective starting and stopping of charging of the battery; and
   a battery discharge switch for selectively coupling the battery to a lamp for selectively turning the lamp on and off,
   a battery discharge set driver that, when triggered, causes the battery discharge switch to be set to an on-state, wherein the battery discharge set driver may be triggered if the battery discharge set driver is in a standby state, but not if the battery discharge set driver is in a resting state;

a battery discharge reset driver that, when triggered, causes the battery discharge switch to be reset to an off-state, wherein the battery discharge reset driver may be triggered if the battery discharge reset driver is in a standby state, but not if the battery discharge reset driver is in a resting state;

wherein when the battery discharge switch is in an on-state, the battery discharge switch connects power to the battery discharge reset driver to prepare the battery discharge reset driver in the standby state, and disconnects power from the battery discharge set driver to prepare the battery discharge set driver in the resting state, wherein when the battery discharge switch is in the off-state, the battery discharge switch connects power to the battery discharge set driver to prepare the battery discharge set driver in the standby state, and disconnects power from the battery discharge reset driver to prepare the battery discharge reset driver in the resting state, wherein the lamp contains a second part of the control unit for protecting the battery from over-charged and over-drained conditions such that the second part of the control unit is not present within the controller.

2. The controller in accordance with claim 1, wherein the battery charging switch is configured to be in a previous state until power is applied to drive the discharging switch to an opposite subsequent state.

3. The controller in accordance with claim 2, wherein the battery charging switch is a latch-relay.

4. The controller in accordance with claim 1, wherein the battery discharge switch switches less than 12 times per day.

5. The controller in accordance with claim 4, wherein the battery charge switch switches less than 12 times per day.

6. A controller for an LED lighting system, the controller being a first part of a control unit and comprising:

a battery charging switch for selectively coupling a solar panel to a battery for selective starting and stopping of charging of the battery; and a battery discharging switch for selectively coupling the battery to a lamp for selectively turning the lamp on and off, a battery charge set driver that, when triggered, causes the battery charge switch to be set to an on-state, wherein the battery charge set driver may be triggered if the battery charge set driver is in a standby state, but not if the battery charge set driver is in a resting state;

a battery charge reset driver that, when triggered, causes the battery charge switch to be reset to an off-state, wherein the battery charge reset driver may be triggered if the battery charge reset driver is in a standby state, but not if the battery charge reset driver is in a resting state;

wherein when the battery charge switch is in an on-state, the battery charge switch connects power to the battery charge reset driver to prepare the battery charge reset driver in the standby state, and disconnects power from the battery charge set driver to prepare the battery charge set driver in the resting state, wherein when the battery charge switch is in the off-state, the battery charge switch connects power to the battery charge set driver to prepare the battery charge set driver in the standby state, and disconnects power from the battery charge reset driver to prepare the battery charge reset driver in the resting state, wherein the lamp contains a second part of the control unit for protecting the battery from over-charged and over-drained conditions such that the second part of the control unit is not present within the controller.

7. The controller in accordance with claim 6, wherein the second part of the control unit controls how much electrical power is supplied to the lamp when the lamp is on.

8. The controller in accordance with claim 6, further comprising:

a battery discharge set driver that, when triggered, causes the battery discharge switch to be set to an on-state, wherein the battery discharge set driver may be triggered if the battery discharge set driver is in a standby state, but not if the battery discharge set driver is in a resting state;

a battery discharge reset driver that, when triggered, causes the battery discharge switch to be reset to an off-state, wherein the battery discharge reset driver may be triggered if the battery discharge reset driver is in a standby state, but not if the battery discharge reset driver is in a resting state;

wherein when the battery discharge switch is in an on-state, the battery discharge switch connects power to the battery discharge reset driver to prepare the battery discharge reset driver in the standby state, and disconnects power from the battery discharge set driver to prepare the battery discharge set driver in the resting state, wherein when the battery discharge switch is in the off-state, the battery discharge switch connects power to the battery discharge set driver to prepare the battery discharge set driver in the standby state, and disconnects power from the battery discharge reset driver to prepare the battery discharge reset driver in the resting state.

9. An LED lamp system comprising:

a controller;

an LED lamp;

and a battery, wherein the controller comprises:

a first part of a control unit that includes a battery discharging switch for selectively coupling the battery to a lamp for selectively turning the LED lamp on and off, a battery discharge set driver that, when triggered, causes the battery discharge switch to be set to an on-state, wherein the battery discharge set driver may be triggered if the battery discharge set driver is in a standby state, but not if the battery discharge set driver is in a resting state;

a battery discharge reset driver that, when triggered, causes the battery discharge switch to be reset to an off-state, wherein the battery discharge reset driver may be triggered if the battery discharge reset driver is in a standby state, but not if the battery discharge reset driver is in a resting state;

wherein when the battery discharge switch is in an on-state, the battery discharge switch connects power to the battery discharge reset driver to prepare the battery discharge reset driver in the standby state, and disconnects power from the battery discharge set driver to prepare the battery discharge set driver in the resting state, wherein when the battery discharge switch is in the off-state, the battery discharge switch connects power to the battery discharge set driver to prepare the battery discharge set driver in the standby state, and disconnects power from the battery discharge reset driver to prepare the battery discharge reset driver in the resting state, wherein the LED lamp contains a second part of the control unit for regulating the energy consumption of the lamp in according to a state of energy storage in the battery such that the second part of the control unit is not present within the controller.

10. An LED lamp system comprising:
a controller;
an LED lamp; and
a battery,
wherein the controller comprises:
a first part of a control unit that includes a battery charge switch for selectively coupling a solar panel to a battery for selective starting and stopping of charging of the battery; and a battery discharge switch for selectively coupling the battery to a lamp for selectively turning the lamp on and off;
a battery discharge set driver that, when triggered, causes the battery discharge switch to be set to an on-state, wherein the battery discharge set driver may be triggered if the battery discharge set driver is in a standby state, but not if the battery discharge set driver is in a resting state;
a battery discharge reset driver that, when triggered, causes the battery discharge switch to be reset to an off-state, wherein the battery discharge reset driver may be triggered if the battery discharge reset driver is in a standby state, but not if the battery discharge reset driver is in a resting state;
wherein when the battery discharge switch is in an on-state, the battery discharge switch connects power to the battery discharge reset driver to prepare the battery discharge reset driver in the standby state, and disconnects power from the battery discharge set driver to prepare the battery discharge set driver in the resting state,
wherein when the battery discharge switch is in the off-state, the battery discharge switch connects power to the battery discharge set driver to prepare the battery discharge set driver in the standby state, and disconnects power from the battery discharge reset driver to prepare the battery discharge reset driver in the resting state,
wherein the LED lamp contains a second part of the control unit for protecting the battery over-charged and over-drained conditions such that the second part of the control unit is not present within the controller.

11. The LED lamp system in accordance with claim 10, wherein the controller further comprises:
a battery charge set driver that, when triggered, causes the battery charge switch to be set to an on-state, wherein the battery charge set driver may be triggered if the battery charge set driver is in a standby state, but not if the battery charge set driver is in a resting state;
a battery charge reset driver that, when triggered, causes the battery charge switch to be reset to an off-state, wherein the battery charge reset driver may be triggered if the battery charge reset driver is in a standby state, but not if the battery charge reset driver is in a resting state;
wherein when the battery charge switch is in an on-state, the battery charge switch connects power to the battery charge reset driver to prepare the battery charge reset driver in the standby state, and disconnects power from the battery charge set driver to prepare the battery charge set driver in the resting state,
wherein when the battery charge switch is in the off-state, the battery charge switch connects power to the battery charge set driver to prepare the battery charge set driver in the standby state, and disconnects power from the battery charge reset driver to prepare the battery charge reset driver in the resting state.

12. The LED lamp system in accordance with claim 10, further comprising:
the solar panel.

13. The LED lamp system in accordance with claim 10, further comprising:
the battery.

14. An LED lamp system comprising:
a controller;
an LED lamp; and
a battery,
wherein the controller comprises:
a first part of a control unit that includes a battery charging switch for selectively coupling a solar panel to a battery for selective starting and stopping of charging of the battery; and a battery discharging switch for selectively coupling the battery to a lamp for selectively turning the lamp on and off,
a battery charge set driver that, when triggered, causes the battery charge switch to be set to an on-state, wherein the battery charge set driver may be triggered if the battery charge set driver is in a standby state, but not if the battery charge set driver is in a resting state;
a battery charge reset driver that, when triggered, causes the battery charge switch to be reset to an off-state, wherein the battery charge reset driver may be triggered if the battery charge reset driver is in a standby state, but not if the battery charge reset driver is in a resting state;
wherein when the battery charge switch is in an on-state, the battery charge switch connects power to the battery charge reset driver to prepare the battery charge reset driver in the standby state, and disconnects power from the battery charge set driver to prepare the battery charge set driver in the resting state,
wherein when the battery charge switch is in the off-state, the battery charge switch connects power to the battery charge set driver to prepare the battery charge set driver in the standby state, and disconnects power from the battery charge reset driver to prepare the battery charge reset driver in the resting state,
wherein the LED lamp contains a second part of the control unit for protecting the battery over-charged and over-drained conditions such that the second part of the control unit is not present within the controller.

15. A device comprising:
a switch;
a first subsystem comprising:
a first driving circuit configured to drive the switch from an off-state to an on-state when triggered; and
a first trigger circuit configured to trigger the first driving circuit when the first trigger circuit receives a first signal generated when a first condition is encountered; and
a second subsystem comprising:
a second driving circuit configured to drive the switch from the on-state to the off-state when triggered; and
a second trigger circuit configured to trigger the first driving circuit when the second trigger circuit receives a second signal generated when a second condition is encountered, wherein:
the switch controls the connection and disconnection of a power source to the first subsystem and the second subsystem, such that the switch connects only one of the first and second subsystems at a time to the power source making the connected subsystem in a standby-state, and making the other of the first and second subsystem a disconnected subsystem at that time and thus being in a resting-state, wherein when the first subsystem is in the standby-state and the first signal is received, the first trigger circuit drives the switch and also disconnects the power source from the first subsystem causing the first subsystem to enter the resting-state, and also connects the power source to the second subsystem causing the second subsystem to enter the standby-state;

wherein when the second subsystem is in the standby-state and the second signal is received, the second trigger circuit drives the switch and also disconnects the power source from the second subsystem causing the second subsystem to enter the resting-state, and also connects the power source to the first subsystem causing the first subsystem to enter the standby-state.

* * * * *